United States Patent [19]
Reeve

[11] 3,821,440
[45] June 28, 1974

[54] PROCESS FOR THE PREPARATION OF AN INSTANT TEA POWDER

[76] Inventor: Brian Eldred Reeve, 35 Marford Hill, Marford, Wales

[22] Filed: Apr. 24, 1972

[21] Appl. No.: 246,958

[30] Foreign Application Priority Data
Apr. 26, 1971  Great Britain.................. 11331/71

[52] U.S. Cl............... 426/312, 426/193, 426/366, 426/387, 426/435, 426/471
[51] Int. Cl. ................................................. A23f 3/00
[58] Field of Search .......... 99/76, 77; 426/193, 366, 426/387, 435, 471

[56] References Cited
UNITED STATES PATENTS
| | | | |
|---|---|---|---|
| 3,151,985 | 10/1964 | Fobes................................. | 99/76 X |
| 3,163,539 | 12/1964 | Barch................................. | 99/76 X |
| 3,392,028 | 7/1968 | Vuataz................................ | 99/76 |
| 3,438,785 | 4/1969 | Zameitat et al.................... | 99/76 X |
| 3,477,854 | 11/1969 | Vuataz et al....................... | 99/76 X |
| 3,484,246 | 12/1969 | Moore, Jr. et al................. | 99/76 |
| 3,484,247 | 12/1969 | Graham et al..................... | 99/76 |
| 3,484,248 | 12/1969 | Graham et al..................... | 99/76 |
| 3,649,297 | 3/1972 | Millin................................. | 99/77 |

FOREIGN PATENTS OR APPLICATIONS
| | | | |
|---|---|---|---|
| 1,207,326 | 9/1970 | Great Britain...................... | 99/76 |
| 589,271 | 12/1959 | Canada............................... | 99/77 |

*Primary Examiner*—Tim R. Miles
*Assistant Examiner*—Steven L. Weinstein
*Attorney, Agent, or Firm*—Brumbaugh, Graves, Donohue & Raymond

[57] ABSTRACT

An instant tea powder of low bulk density rehydratable in hot or cold water to form a clear black tea beverage is prepared by combining an extract of green or partly fermented tea with a tea extract obtained by oxidising in alkaline solution the water soluble constituents of green or partly fermented tea and drying the combined extract.

12 Claims, 4 Drawing Figures

PROCESS FOR THE PREPARATION OF AN INSTANT TEA POWDER

This invention relates to instant tea powders, and particularly to the production of an instant tea powder having good solubility in cold and hot water and a low bulk density.

The invention provides a process for the preparation of an instant tea powder in which an extract of green tea or partly fermented tea is combined with a tea extract obtained by oxidising in alkaline solution the water-soluble constituents of unfermented or partly fermented tea and the combined extract is dried.

The term 'green tea' is used in this specification to denote unfermented tea which has been heated to inactivate the natural enzymes.

The green tea extract which is combined with the alkaline oxidised tea extract is preferably an extract of unfired green tea. The initial step of heating the fresh tea leaf to inactivate the enzymes therein may be carried out by steam heating, by heating with hot water, or by heating the leaf in a hot iron pan ("panning"), as described on page 2 of "Tea Manufacture" by C R Harler (Oxford University Press, 1963). If the step of inactivating the enzymes of the fresh leaf is carried out by heating with steam or hot water, appreciable quantities of soluble tea solids may be incidentally extracted from the leaf. These can be utilised by collecting the liquor resulting from the inactivation procedure and incorporating it later in the green tea extract prepared from the inactivated leaf.

A form of apparatus (a screw press) in which enzyme inactivation of fresh tea leaf can be carried out and which has provision for collection of the liquor removed is shown diagrammatically in FIG. 1 of the accompanying drawings. The press has a feed chamber 1 leading to a pressure chamber 2. A steam manifold 3 having holes such as 4 is situated in the feed chamber 1. The screw 5 mounted on shaft 6 rotates within the pressure chamber 2. The pressure chamber is defined by a perforated cone 7 which is itself surrounded by an outer casing 8 having an outlet at 9. A pressure plate 10 is situated adjacent the end of the screw 5.

In use, fresh tea leaf (conveniently partly comminuted by a single pass through a Rotorvane) is loaded into the top of a feed chamber at 11 and steam is passed to the manifold 3. The steam issues through the holes 4 and heats the tea leaf in the chamber 1 sufficiently to inactivate its enzymes. The tea leaf is then compressed by screw 5 in the pressure chamber 2. Condensed steam, together with some of the tea juices is expressed from the mass of tea leaf and this liquor passes through the perforated cone 7 and is collected from outlet 9. The cone 7 retains the tea leaf and this is expelled between the screw and the pressure plate at 12. The expelled inactivated tea leaf is in a condition ready for rolling.

Such a screw press can also be used in a process where hot water, for example at 80° to 100°C, is used to inactivate the fresh tea leaf. In this case hot water is fed in simultaneously with the leaf. Steam may be sparged into the water through the steam manifold to maintain the high temperature of the water. The liquor and inactivated leaf are collected separately as described above.

If the enzyme inactivation is carried out by steaming, the liquor obtained is conveniently added to the extract to be obtained from the inactivated green tea leaf. The liquor resulting from inactivation by hot water can also be used in this way; however, since it is generally more dilute than the liquor resulting from steaming it is preferably employed as the solvent for making the green tea extract.

After the heating step and before extraction, the tea leaf is preferably comminuted. Comminution can be carried out in rolling apparatus, for example in a Rotorvane, in a CTC (crushing, tearing, and curling machine) or by conventional rollers. The comminuted tea leaf is then extracted by hot water using, for example, an open countercurrent extraction system in which the tea leaf is separated from the extract at each stage by a screw press of the kind illustrated in FIG. 1. Alternatively column extraction can be used.

In carrying out the invention using an extract of partly fermented tea, as distinct from green tea, oolong tea, prepared by comminuting fresh tea leaf in rolling apparatus, allowing the tea to ferment for a relatively short time and heating to destroy the enzymes, may be extracted with hot water by means of the systems (open countercurrent extraction and column extraction) just described for green tea. However it is more convenient to proceed as follows. Fresh tea leaf (which may have undergone a withering treatment) is comminuted in rolling apparatus such as a Rotorvane, a C.T.C. or conventional rollers, and after fermentation has been allowed to proceed for a relatively short time (of the order of 10 minutes, well before fermentation has reached the stage corresponding to black tea) the partly fermented leaf is extracted with water that is sufficiently hot to destroy the enzymes responsible for fermentation.

The unfermented or partly fermented tea material whose water-soluble constituents are subjected to oxidation in alkaline solution is preferably an extract of green tea or partly fermented tea, for example an extract prepared as described above, although it may be an infusion of fresh, green or oolong tea leaf.

The alkaline oxidation step is preferably carried out with hydrogen peroxide generally as described in UK patent 1,204,576. The infusion or extract is first adjusted to a pH above 7, preferably from 8 to 10 by addition of a non toxic base such as potassium hydroxide or sodium hydroxide. Hydrogen peroxide is then added, preferably in a proportion of 7 to 15 percent by weight based on the soluble tea solids present. The infusion or extract is preferably heated at 50° to 100°C to accelerate the oxidation reaction and heating is preferably continued until substantially all the hydrogen peroxide has been consumed.

An alternative method of carrying out the alkaline oxidation uses molecular oxygen as described in UK patent 1,106,640. The oxygen can be in the form of air, pure oxygen, or oxygen enriched air, and is suitably sparged in the form of small bubbles into the tea extract or infusion at the bottom of the vessel containing it. The pH of the extract or infusion if oxygen is used is preferably from 8 to 10 and the oxidation is preferably carried out at an elevated temperature, such as 70° to 100°C. The air or oxygen used can contain ozone to aid the oxidation process as described in UK patent 1,211,621. The ozone can be used at concentrations of up to 2 percent by volume of the air or oxygen stream sparged into the extract or infusion. If ozone is used, the oxidation can be carried out at a lower pH, for example at pH 7 to 8.

We have found that when oxygen is used in the alkaline oxidation a redder colour is obtained compared to oxidation with hydrogen peroxide. Alternatively, if alkaline oxygen oxidation is carried out for a long time, such as 30 to 45 minutes, a very dark oxidised extract can be obtained.

If the tea subjected to alkaline oxidation is in the form of an infusion, the leaf content thereof should be removed after oxidation before the oxidised matter is combined with the extract of green tea or partly fermented tea.

The alkaline oxidised tea extract preferably undergoes a de-hazing step in which it is treated with a calcium salt such as calcium chloride before it is combined with the green tea extract. The calcium salt precipitates any substances present in the alkaline oxidised extract which might otherwise cause cloudiness when the eventual instant tea powder is reconstituted in hard water. Treatment with the calcium salt is followed by centrifuging, preferably at low temperatures such as 0° to 10°C.

The same tea extract can be used both as the green or partly fermented tea constituent of the combined extract which is to be dried, and as the starting material for alkaline oxidation treatment. Thus, in a preferred procedure an extract of green tea or partly fermented tea is divided into two portions, one only of these portions is oxidised and is then recombined with the other.

The tea extract may undergo various treatments before it is divided. In particular, it is preferably subjected to an 'aroma stripping' step in which volatile aroma ingredients are removed from the extract, for example under reduced pressure (100 to 200 ml Hg). The volatile ingredients which are removed can then be concentrated by conventional means if desired, taking care not to destroy the character of the aroma, and then added back after the green or partly fermented tea extract and the alkaline oxidised extract have been combined. Preferably this addition takes place immediately before the final drying step.

The extract of green tea or partly fermented tea is preferably combined with the alkaline oxidised extract in a proportion of from 70:30 to 10:90 by weight based on soluble tea solids. The relative proportions of green or partly fermented tea extract and alkaline oxidised extract (the latter having a flavour and colour somewhat resembling that of black tea) can be varied according to the character required in the instant tea, and the colour and flavour of the oxidised tea extract used (a low proportion is used of a very dark oxidised extract, such as that obtained by prolonged oxidation with oxygen). The proportion of green or partly fermented tea extract in the blend should be relatively high if a particularly low bulk density is desired, especially if the pectin content of the tea leaf (which is seasonally variable) is low. When the pectin content is high, as with Ceylon tea leaf plucked in January, blends in which the ratio of green or partly fermented tea extract to alkaline oxidised extract is from 50:50 to 20:80, particularly 35:65 to 20:80, have been found to yield instant tea powder having a bulk density of 80 to 100 g per litre after spray-drying, which powder reconstitued to a beverage having good flavour and colour. When the pectin content is low, as with Ceylon tea plucked in May, the ratio of green or partly fermented tea extract to alkaline oxidised extract is preferably from 65:35 to 45:55.

The combined extract is preferably dried by spray-drying, but freeze-drying can be used if desired. The combined extract may be concentrated by evaporation before spray-drying. If an aroma stripping step has been carried out, the aroma is added back after this concentration step.

The pH of the combined extract submitted to drying is preferably adjusted to be in the range 5.2 to 5.9, preferably with citric acid, whose presence in the product improves colour on reconstitution and reduces any tendency to scum formation in very hard or alkaline water. If these are not important factors, the pH can be adjusted by other non-toxic acidifying agents, such as hydrochloric acid or a cation exchange resin.

The process of the invention can be operated to provide an instant tea powder of consistent properties having a lower bulk density than that obtained by drying a black tea extract alone. Additionally, the product is on reconstitution markedly less turbid than an instant tea produced by drying a mixture of green tea extract and black tea extract prepared by convention fermentation.

The invention is illustrated by the following Examples, which will be described with reference to FIGS. 2, 3 and 4 of the accompanying drawings of which:

Figure 2:
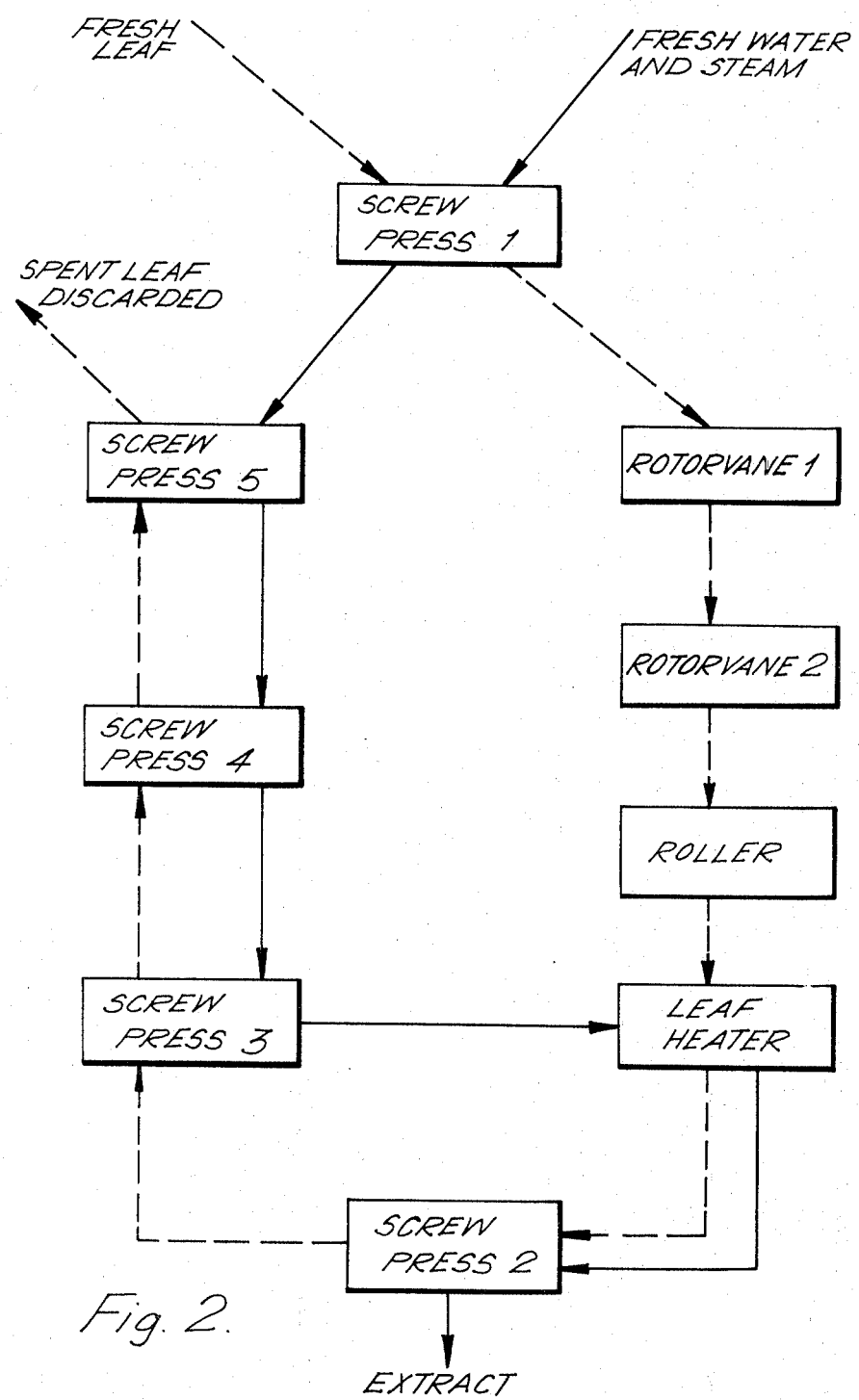
FIG. 2 is a flow chart illustrating the preparation of a green tea extract.

EXAMPLE 1 a. A green tea extract was prepared generally according to the process shown in FIG. 2.

Figure 1:
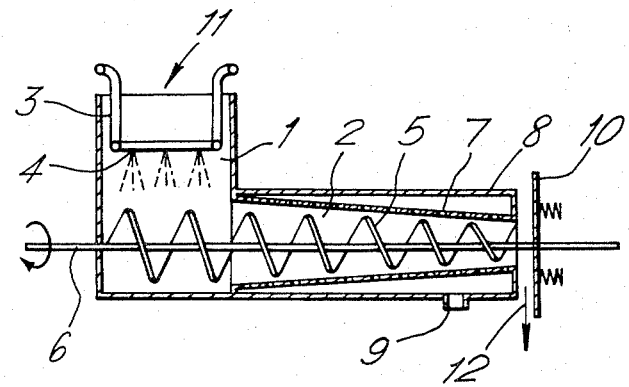
Figure 3:
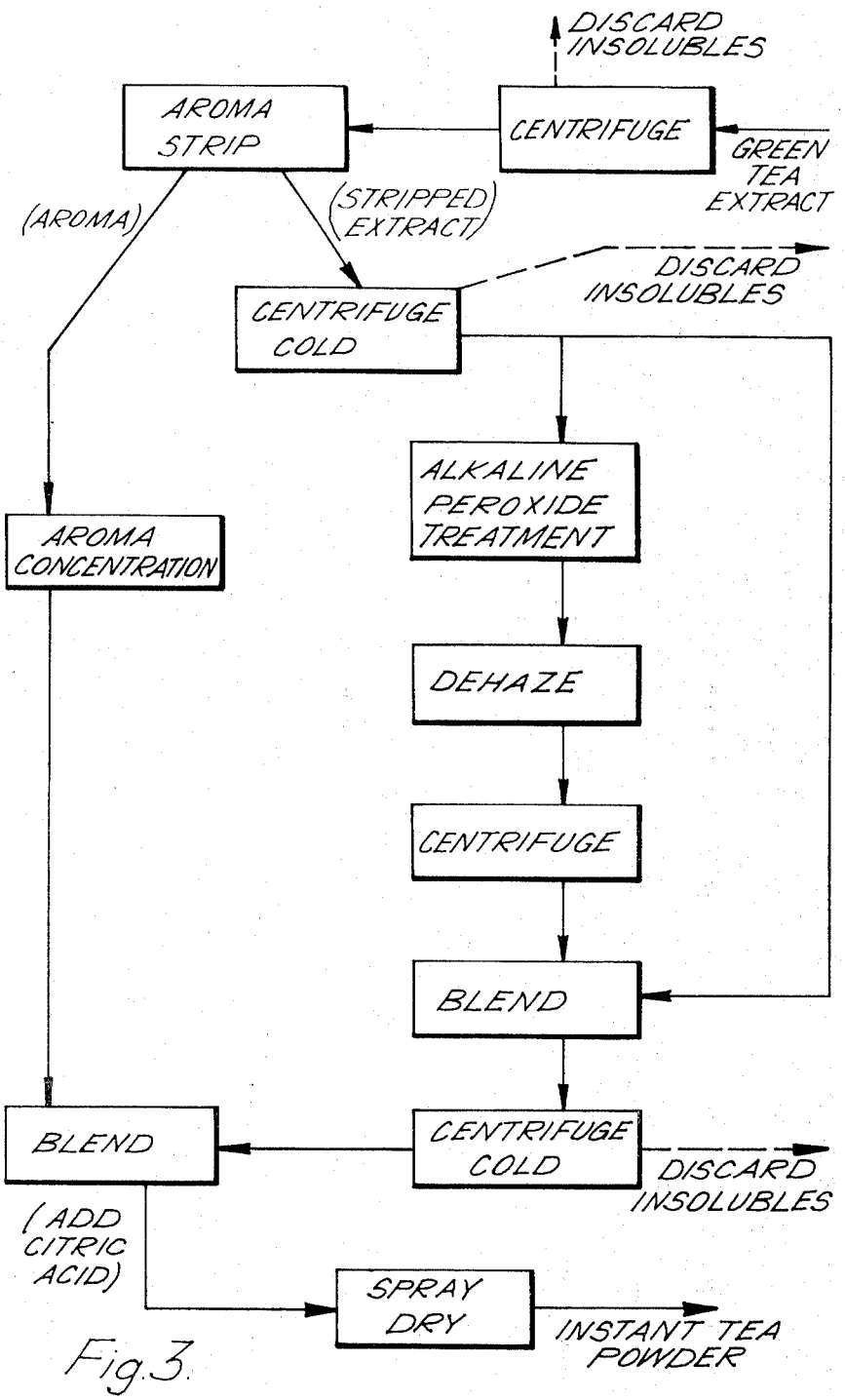
FIG. 3 is a flow chart illustrating the preparation of an instant tea powder from a green tea extract.

Unwithered fresh tea leaf (Ceylon tea plucked in January) was fed at a rate of 900 lb per hour into the feed chamber of screw press 1 (of the type illustrated in FIG. 1 of the accompanying drawings). Water at 96°C was simultaneously fed into he chamber at about 1,650 lb per hour. Sufficient saturated steam was sparged into the feed chamber to maintain the temperature of the contents at about 85°C. A dilute tea extract was collected from the outlet of the outer casing of the screw press and green tea leaf with its enzymes inactivated was expelled between the end of the screw of the press and the pressure plate positioned adjacent it. The green tea leaf was fed successively to two Rotorvanes and a heavy roller. The rolled leaf was then extracted in four countercurrent stages (screw presses 2, 3, 4, amd 5, all of the type illustrated in FIG. 1) using as the extraction medium in screw press 5 the dilute tea extract recovered from the enzyme inactivation procedure carried out in screw press 1. The leaf entering the countercurrent extraction system and the liquor used to extract it (the liquor collected from screw press 3) were heated to about 96°C in a heat exchanger (the 'leaf heater') before being passed to the final extraction step in screw press 2. The green tea extract was recovered from this press at about 80°C.

b. The green tea extract thus obtained was further treated according to the process illustrated in FIG. 3 of the accompanying drawings.

The green tea extract was centrifuged at 60°C and tea leaf was rejected. Volatile material was then removed from the extract in an 'aroma stripping' step carried out in a falling film evaporator. The volatile aroma material which distilled off was concentrated and retained. The extract (now of 15 percent by weight solids content) from which aroma had been stripped was cooled to 5°C using a plate cooler followed by a Votator and was then centrifuged. The solid material which was collected was discarded.

The green tea extract was then divided into two portions in the ratio 70:30. The smaller of these portions was retained untreated. The larger portion was concentrated to 20 percent solids in a Centritherm evaporator and 16 percent by weight of potassium hydroxide (based on tea solids) was added to it. The extract was boiled for 10 minutes and was then cooled to 30°C. 11.2 percent by weight of hydrogen peroxide (based on tea solids) was then added in the form of a 35 percent aqueous solution. The extract was again boiled for 10 minutes after which time it was found that there was no hydrogen peroxide remaining in the extract. 1 percent by weight of calcium chloride dihydrate (based on tea solids) was then added to dehaze the extract, and the extract was cooled to between 5° and 10°C at which temperature it was centrifuged. The insoluble matter obtained was discarded.

The untreated green tea extract was then combined with the alkaline peroxide treated extract. The combined extract was cooled to about 10°C and was centrifuged, but practically no insoluble matter was obtained. The combined extract was then concentrated in a Centritherm evaporator to a solids content of between 43 and 45 percent. At this stage the aroma removed from the green tea extract before it was divided was added back to the combined extract. Citric acid dihydrate was then added in an amount of 5.4 percent by weight based on tea solids to adjust the pH to 5.5. The extract was then dried in a spray-drying tower to yield an instant tea powder having a bulk density which was consistently about 90 g per litre. The instant tea powder could be reconstituted in hot or cold (below 10°C) water to yield a clear beverage having a bright colour and good flavour.

Figure 4:
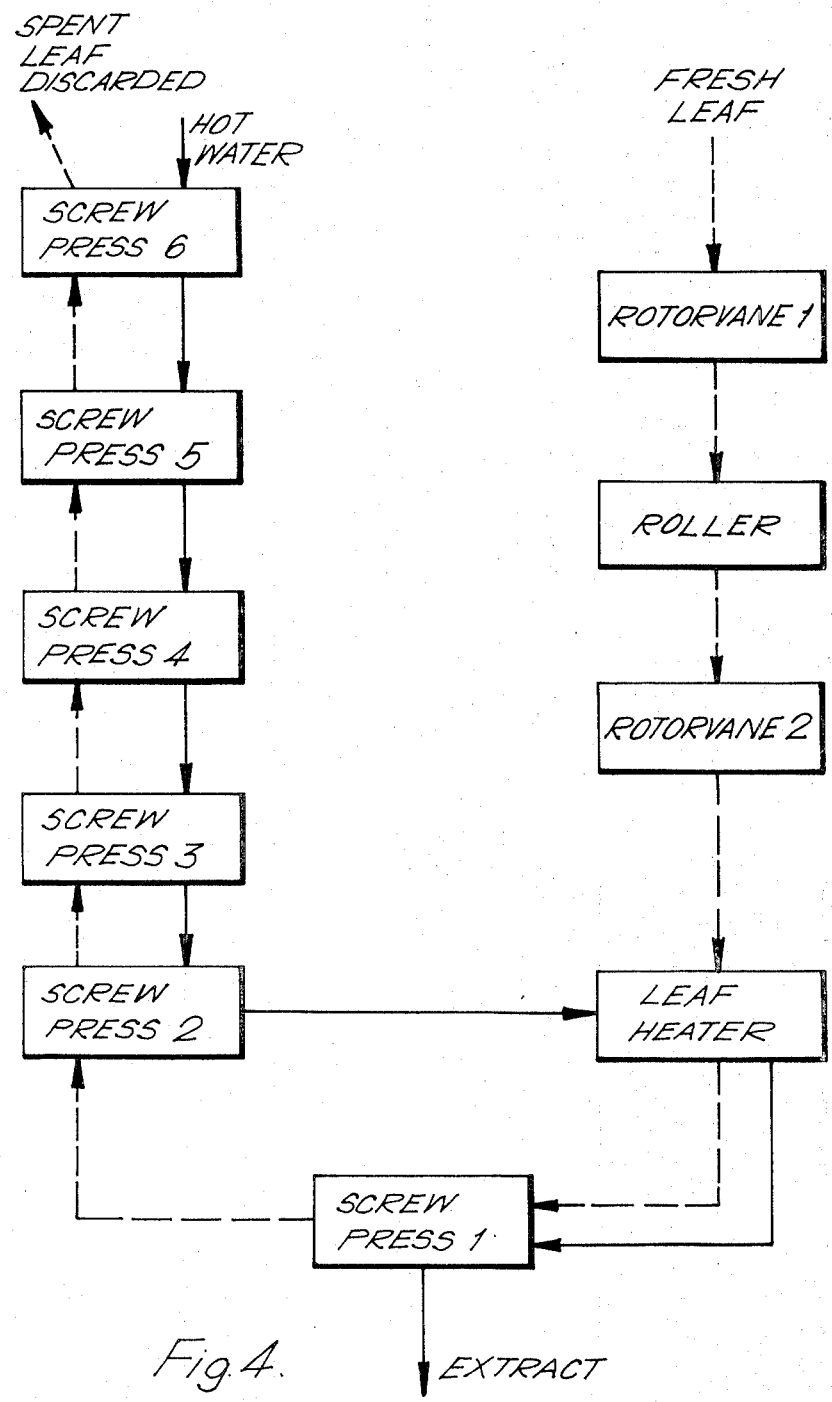
FIG. 4 is a flow chart illustrating the preparation of an extract of partly fermented tea

EXAMPLE 2 a. An extract of partly fermented tea was prepared generally according to the process shown in FIG. 4.

Fresh tea leaf (Ceylon tea plucked in May) was passed at a rate of 1,200 lb per hour through a 15 inch Rotorvane followed by a heavy roller and a second 15 inch Rotorvane. The comminuted leaf, which had had a fermentation time of approximately ten minutes, was then passed directly to the extraction system. The leaf was extracted in six counter-current stages (screw presses 1 to 6, all of the type illustrated in FIG. 1). Hot water was fed to screw press 6 at a rate of 1,200 litres per hour. The leaf entering the extraction system and the liquor used to extract it (the liquor collected from screw press 2) were heated to 90° – 95°C in the 'leaf heater' before being passed to the final extraction step in screw press 1. The hot liquor, as well as extracting solubles from the leaf, served to stop fermentation. An extract of partly fermented tea was recovered from screw press 1.

b. The tea extract thus obtained was further treated by a process generally similar to that shown in FIG. 3.

The tea extract was centrifuged while still hot and tea leaf was rejected. The extract was then evaporated to 12 – 15 percent solids content, the volatile aroma material which distilled off being recovered and concentrated.

The extract remaining was divided into two approximately equal portions. One of these was retained untreated. Potassium hydroxide was added to the other portion to adjust the pH to 9, after which it was sparged with air at a rate of about 100 s.c.f.m. for 40 minutes at a temperature of 85°C. The colour of the extract became very dark. Citric acid was added to the oxidised extract to adjust its pH to 5.5. Calcium chloride was added to remove any matter which would be insoluble in hard water, and the extract was cooled to 10°C and centrifuged.

The untreated extract of partly fermented tea was then combined with the oxidised extract, and the combined extract was cooled to 10°C, centrifuged, and concentrated in a Centritherm evaporator to a solids content of 45 percent. The volatile aroma material which has been recovered and concentrated was added to the concentrate, and the product was spray dried. The instant tea powder produced had a bulk density of 90 gm/litre and was readily soluble in hot or cold water to yield a clear black tea beverage having a bright colour and good flavour.

What is claimed is:

1. A process for the preparation of an instant tea powder comprising:
    i. providing an extract of green tea or partly fermented tea wherein the tea enzymes have been inactivated;
    ii. dividing the said extract into two portions;
    iii. oxidizing one of the said portions in alkaline solution;
    iv. recombining the non-oxidized portion and the oxidized portion in a weight ratio, based on soluble tea solids, of from about 70:30 to about 10:90; and
    v. drying the combined extract.

2. A process according to claim 1 further comprising the steps of removing volatile ingredients from the tea extract before it is divided and adding the volatile ingredients back after the two portions of the extract have been recombined.

3. A process for the preparation of an instant tea powder comprising:
    i. providing a first extract of green tea or partly fermented tea wherein the tea enzymes have been inactivated;
    ii. providing a second tea extract obtained by oxidizing in alkaline solution water soluble tea constituents of green tea or partly fermented tea, the tea enzymes therein bring inactivated;
    iii. combining the first extract with the second extract in a weight ratio, based on soluble tea solids, of from about 70:30 to about 10:90; and
    iv. drying the combined extract.

4. A process according to claim 3 in which the combined extract is dried by spray drying.

5. A process according to claim 3 in which the said first tea extract is combined with the said second tea extract in a proportion of 50:50 to 20:80 based on the weight of soluble tea solids in each extract.

6. A process according to claim 3 in which the oxidation is carried out using hydrogen peroxide as the oxidising agent.

7. A process according to claim 6 in which the oxidation takes place at 50° – 100°C.

8. a process according to claim 3 comprising the further step of adjusting the pH of the combined extract to 5.2 to 5.9 before drying.

9. A process according to claim 8 in which the pH is adjusted with citric acid.

10. A process according to claim 3 in which the oxidation is carried out using molecular oxygen as the oxidising agent.

11. A process according to claim 10 in which the oxygen is used in the form of air or oxygen enriched air.

12. A process according to claim 10 in which the oxidation takes place at 70° – 100°C.

* * * * *